US009512858B2

(12) United States Patent
Nakajima et al.

(10) Patent No.: US 9,512,858 B2
(45) Date of Patent: Dec. 6, 2016

(54) EJECTOR

(71) Applicant: DENSO CORPORATION, Kariya, Aichi-pref. (JP)

(72) Inventors: Daisuke Nakajima, Kariya (JP); Haruyuki Nishijima, Obu (JP); Etsuhisa Yamada, Kariya (JP); Hideya Matsui, Kariya (JP); Kenta Kayano, Obu (JP); Yoshiyuki Yokoyama, Obu (JP); Tatsuhiro Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 35 days.

(21) Appl. No.: 14/443,859

(22) PCT Filed: Nov. 13, 2013

(86) PCT No.: PCT/JP2013/006669
§ 371 (c)(1),
(2) Date: May 19, 2015

(87) PCT Pub. No.: WO2014/080596
PCT Pub. Date: May 30, 2014

(65) Prior Publication Data
US 2015/0316075 A1 Nov. 5, 2015

(30) Foreign Application Priority Data

Nov. 20, 2012 (JP) .................................. 2012-254398
Oct. 21, 2013 (JP) .................................. 2013-218369

(51) Int. Cl.
*F04F 5/46* (2006.01)
*F25B 41/00* (2006.01)
*F25B 41/06* (2006.01)

(52) U.S. Cl.
CPC ............... *F04F 5/46* (2013.01); *F25B 41/003* (2013.01); *F25B 41/062* (2013.01); *F25B 2341/0012* (2013.01); *F25B 2600/0253* (2013.01); *Y02B 30/741* (2013.01)

(58) Field of Classification Search
CPC ....... F24F 5/46; F25B 41/003; F25B 41/062; F25B 2600/0253; F25B 2341/0012; Y02B 30/741

USPC .................................................... 62/500, 515
See application file for complete search history.

(56) References Cited

U.S. PATENT DOCUMENTS

| 5,313,711 A | 5/1994 | Kling, III et al. |
| 6,910,343 B2 * | 6/2005 | Ozaki ..................... F25B 9/008 |
| | | 417/185 |
| 6,941,768 B2 * | 9/2005 | Ikegami ............... B60H 1/3214 |
| | | 62/288 |
| 2002/0000095 A1 | 1/2002 | Takeuchi et al. |

(Continued)

FOREIGN PATENT DOCUMENTS

| JP | 61054154 U | 4/1986 |
| JP | H10246500 A | 9/1998 |

(Continued)

OTHER PUBLICATIONS

International Search Report and Written Opinion (in Japanese with English Translation) for PCT/JP2013/006669, mailed Jan. 28, 2014; ISA/JP.

*Primary Examiner* — Mohammad M Ali
(74) *Attorney, Agent, or Firm* — Harness, Dickey & Pierce, P.L.C.

(57) ABSTRACT

An ejector includes (i) a body part including a depressurizing space in which a refrigerant flowing out of a swirling space is depressurized, a suction passage that draws a refrigerant from an external, and a pressurizing space in which a jet refrigerant jetted from the depressurizing space and a suction refrigerant drawn from the suction passage are mixed with each other to be pressurized, (ii) a conical passage formation member which is arranged inside the body part, and (iii) a swirling promotion part. A nozzle passage is provided in the depressurizing space on an outer peripheral surface of the passage formation member, and a diffuser passage is provided in the pressurizing space on the outer peripheral surface of the passage formation member. The swirling promotion part includes a flow regulation plate that promotes a swirling flow of the refrigerant flowing in the diffuser passage.

10 Claims, 10 Drawing Sheets

(56) References Cited

U.S. PATENT DOCUMENTS

| | | | |
|---|---|---|---|
| 2004/0089019 A1* | 5/2004 | Kawamura | F04F 5/04 62/500 |
| 2004/0172966 A1* | 9/2004 | Ozaki | F04F 5/04 62/500 |
| 2005/0155374 A1* | 7/2005 | Oshitani | F25B 41/00 62/500 |
| 2007/0271942 A1* | 11/2007 | Yokoyama | F25B 41/00 62/278 |
| 2010/0175422 A1 | 7/2010 | Yamada et al. | |
| 2015/0033790 A1 | 2/2015 | Yamada et al. | |

FOREIGN PATENT DOCUMENTS

| | | |
|---|---|---|
| JP | H11257299 A | 9/1999 |
| JP | 3331604 B2 | 10/2002 |
| JP | 2003014318 A | 1/2003 |
| JP | 2008202812 A | 9/2008 |
| JP | 2008232458 A | 10/2008 |
| JP | 2010181136 A | 8/2010 |
| JP | 2010210111 A | 9/2010 |
| JP | 2013177879 A | 9/2013 |
| WO | WO-2014108974 A1 | 7/2014 |

* cited by examiner

EJECTOR

CROSS REFERENCE TO RELATED APPLICATIONS

This application is a U.S. National Phase Application under 35 U.S.C. 371 of International Application No. PCT/JP2013/006669 filed on Nov. 13, 2013 and published in Japanese as WO 2014/080596 A1 on May 30, 2014. This application is based on and claims the benefit of priority from Japanese Patent Applications No. 2012-254398 filed on Nov. 20, 2012, and No. 2013-218369 filed on Oct. 21, 2013. The entire disclosures of all of the above applications are incorporated herein by reference.

TECHNICAL FIELD

The present disclosure relates to an ejector that depressurizes a fluid and draws a fluid by a suction action of a fluid ejected at high speed.

BACKGROUND ART

Up to now, ejectors have been known as a depressurizing device applied to a vapor compression refrigeration cycle device. The ejector of this type has a nozzle portion that depressurizes refrigerant, draws a gas-phase refrigerant which has flowed out of an evaporator due to a suction action of an ejected refrigerant ejected from the nozzle portion, mixes the ejected refrigerant with the suction refrigerant in a pressure increase part (diffuser portion), thereby being capable of increasing the pressure.

Therefore, in the refrigeration cycle device having the ejector as the depressurizing device (hereinafter referred to as "ejector type refrigeration cycle"), a motive power consumption of the compressor can be reduced with the use of the refrigerant pressure increase action in a pressure increase part of the ejector, and a coefficient of performance (COP) of the cycle can be improved more than that of a normal refrigeration cycle device having an expansion valve as the depressurizing device.

Further, Patent Document 1 discloses an ejector having the nozzle portion which depressurizes the refrigerant in two stages as the ejector applied to the ejector type refrigeration cycle. In more detail, in the ejector of Patent Document 1, the refrigerant of a high pressure liquid-phase state is depressurized into a gas-liquid two-phase state in a first nozzle, and the refrigerant that has been the gas-liquid two-phase state flows into a second nozzle.

With the above configuration, in the ejector of Patent Document 1, boiling of the refrigerant in the second nozzle is promoted to improve a nozzle efficiency as the overall nozzle portion, and the COP is to be further improved as the overall ejector type refrigeration cycle.

Also, in the general ejector, a diffuser portion (pressure increase part) is coaxially arranged on an extension in an axial direction of the nozzle portion. Further, Patent Document 2 discloses that a spread angle of the diffuser portion thus arranged is relatively reduced to enable an improvement in the ejector efficiency.

The nozzle efficiency means energy conversion efficiency when a pressure energy of the refrigerant is converted into a kinetic energy in the nozzle portion. The ejector efficiency means energy conversion efficiency as the overall ejector.

PRIOR ART DOCUMENT

Patent Document

Patent Document 1: JP 3331604 B2
Patent Document 2: JP 2003-14318 A

SUMMARY OF THE INVENTION

However, according to the present inventors' study, in the ejector of Patent Document 1, for example, a heat load of the ejector refrigeration cycle becomes low, and a refrigerant pressure difference (a difference between a high pressure and a low pressure) between a high-pressure side and a low-pressure side in the cycle is reduced. As a result, the difference between the high pressure and the low pressure is depressurized by the first nozzle, and most of the refrigerant may not be depressurized in the second nozzle. In this case, the nozzle efficiency by causing the gas-liquid two phase refrigerant to flow in the second nozzle is not improved. As a result, the refrigerant may not be sufficiently pressurized by the diffuser portion.

On the contrary, when the diffuser portion having the relatively small spread angle disclosed in Patent Document 2 may be applied to the ejector of Patent Document 1 to improve the ejector efficiency, thereby pressurizing the refrigerant sufficiently in the diffuser portion even in the low load of the ejector refrigeration cycle. However, when the diffuser portion of this type is applied, a length of the nozzle portion in the axial direction becomes longer as a whole of the ejector, resulting in a risk that a body of the ejector becomes unnecessarily longer in the normal load of the ejector refrigeration cycle.

Under the circumstances, the present inventors have previously proposed the following ejector in Japanese Patent Application No. 2012-184950 (earlier application example).

The ejector includes: a body part including a swirling space in which a refrigerant that has flowed out of a radiator is swirled, a depressurizing space in which the refrigerant that flowed out of the swirling space is depressurized, a suction passage that communicates with a downstream side of the depressurizing space in a refrigerant flow and draws a refrigerant that has flowed out of an evaporator, and a pressurizing space in which the jet refrigerant jetted from the depressurizing space and the suction refrigerant drawn from the suction passage are mixed together and pressurized; and a passage formation member having at least a portion disposed in the depressurizing space, and a portion disposed in the pressurizing space, and having a conical shape that increases in cross-sectional area with distance from the depressurizing space. A refrigerant passage between an inner peripheral surface of a portion of the body part that defines the depressurizing space in and an outer peripheral surface of the passage formation member is a nozzle passage that functions as a nozzle depressurizing and ejecting the refrigerant that has flowing out of the swirling space. A refrigerant passage between an inner peripheral surface of a portion of the body that defines the pressurizing space and the outer peripheral surface of the passage formation member is a diffuser passage that functions as a diffuser that mixes the jet refrigerant with the suction refrigerant to pressurize the mixture. A gas-liquid separation space is provided to have a rotating body shape coaxially with the passage formation member and separates gas and liquid of the refrigerant that has flowing out of the diffuser passage by the action of a centrifugal force is formed in the body part.

In the ejector of the earlier application example, the refrigerant swirls in the swirling space with the results that a refrigerant pressure on a swirling center side within the swirling space can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space, and has a liquid single phase around the vicinity thereof.

The refrigerant of the two-phase separation state flows into the nozzle passage, and boiling of the refrigerant is promoted by wall boiling and interface boiling. Therefore, the refrigerant puts into a gas-liquid mixed state in which a gas phase and a liquid phase are homogeneously mixed together in the vicinity of a minimum flow area part of the nozzle passage. Further, the refrigerant which has put into the gas-liquid mixed state in the vicinity of the minimum flow area part of the nozzle passage is blocked (choked), and a flow rate of the refrigerant in the gas-liquid mixed state is accelerated to a two-phase sonic speed.

The refrigerant thus accelerated to the two-phase sonic speed becomes an ideal two-phase spray flow in which the two phases are homogeneously mixed together on a downstream side of the minimum flow area part in the nozzle passage, and the flow rate can further increase. As a result, the energy conversion efficiency (corresponding to the nozzle efficiency) in converting a pressure energy of the refrigerant into a velocity energy in the nozzle passage can be improved.

Furthermore, in the ejector of the earlier application example, the passage formation member formed into a conical shape is employed, and a cross-section of the diffuser passage perpendicular to an axial direction thereof when viewed from the axial direction of the passage formation member is formed into an annular shape. The shape of the diffuser passage expands along an outer periphery of the passage formation member with distance from the depressurizing space, and the refrigerant flowing through the diffuser passage is swirled around the axis of the passage formation member.

With the above configuration, since the refrigerant flow channel for pressurizing the refrigerant in the diffuser passage can be formed in a spiral shape, an increase in the axial dimension of the diffuser passage can be restricted. As a result, the upsizing of the body of the overall ejector can be restricted. That is, according to the ejector in the earlier application example, the higher nozzle efficiency can be exerted without upsizing the body irrespective of load variations of the refrigeration cycle.

Further, in the ejector of the earlier application example, the gas-liquid of the refrigerant flowing out of the diffuser passage is separated by the action of the centrifugal force in the gas-liquid separation space formed in the interior of the body. Therefore, as compared with a case in which gas-liquid separation means is arranged outside the body, the gas-liquid of the refrigerant can be efficiently separated in the gas-liquid separation space, and a capacity of the gas-liquid separation space can be effectively reduced.

However, like the ejector in the earlier application example, when the cross-section of the diffuser passage perpendicular to the axial direction is merely formed in the annular shape, there is a risk that a velocity of the refrigerant flowing through the diffuser passage in a swirling direction decreases when a refrigerant flow rate of the refrigerant circulating in the cycle is reduced, for example, at the time of a low load of the ejector refrigeration cycle.

A reduction in the velocity of the refrigerant thus flowing through the diffuser passage in the swirling direction shortens the spiral refrigerant flow channel for pressurizing the refrigerant in the diffuser passage. This leads to a risk that the refrigerant could not be sufficiently pressurized in the diffuser passage. Further, the centrifugal force acting on the refrigerant flowing out of the diffuser passage is reduced, which causes a gas-liquid separation performance of the gas-liquid separation space to be reduced.

In consideration of the above-described points, it is an objective of the present disclosure to provide an ejector capable of achieving a high nozzle efficiency and a high pressurizing performance regardless of load variations of a refrigeration cycle without upsizing the body.

According to an aspect of the present disclosure, an ejector is used for a vapor compression refrigeration cycle device. The ejector includes a body part including a swirling space in which a refrigerant flowing from a refrigerant inlet port is swirled, a depressurizing space in which the refrigerant flowing out of the swirling space is depressurized, a suction passage that communicates with a downstream side of the depressurizing space in a refrigerant flow and draws a refrigerant from an external, and a pressurizing space in which a jet refrigerant jetted from the depressurizing space is mixed with a suction refrigerant drawn from the suction passage. The ejector further includes a passage formation member which includes at least a part disposed inside the depressurizing space and the pressurizing space, and has a conical shape such that a cross-sectional area increases with distance from the depressurizing space. The body part has a nozzle passage that is a refrigerant passage defined between an inner peripheral surface of a portion defining the depressurizing space and an outer peripheral surface of the passage formation member, and the nozzle passage functions as a nozzle that depressurizes and ejects the refrigerant flowing out of the swirling space. The body part has a diffuser passage that is a refrigerant passage defined between an inner peripheral surface of a portion defining the pressurizing space and the outer peripheral surface of the passage formation member, and the diffuser passage functions as a diffuser that mixes the jet refrigerant and the suction refrigerant together and pressurizes the mixed refrigerant. The diffuser passage has an annular shape in a cross-section perpendicular to an axial direction of the passage formation member. The ejector further includes a swirling promotion part that promotes a swirling flow of the refrigerant flowing in the diffuser passage.

Accordingly, the refrigerant is swirled in the swirling space with the results that the energy conversion efficiency (corresponding to the nozzle efficiency) in the nozzle passage can be improved as with the earlier application example. The refrigerant flowing through the diffuser passage is swirled with the results that an increase in the dimension of the diffuser passage in the axial direction can be restricted as with the earlier application example. This makes it possible to provide an ejector capable of achieving a high nozzle efficiency regardless of load variations of a refrigeration cycle without upsizing the body.

In addition, since the swirling promotion part is provided, for example, even if the flow rate of refrigerant circulating in the refrigeration cycle device is reduced, a reduction in the velocity of refrigerant flowing through the diffuser passage in the swirling direction can be restricted. Therefore, a reduction in length of a spiral refrigerant flow channel that pressurizes the refrigerant in the diffuser passage can be restricted, thereby being capable of suppressing a reduction in the pressurizing amount of refrigerant in the diffuser passage.

This makes it possible to provide the ejector capable of achieving a high energy conversion efficiency (corresponding to the nozzle efficiency in the conventional art) in the nozzle passage, and also achieving a high pressurizing performance in the diffuser passage, regardless of load variations of a refrigeration cycle device without upsizing the body.

In addition, the refrigerant flowing through the diffuser passage may swirl in the same direction as that of the refrigerant swirling in the swirling space. As a result, the reduction in the spiral refrigerant flow channel that pressurizes the refrigerant in the diffuser passage is effectively restricted, and the reduction in the pressurizing amount of refrigerant in the diffuser passage can be effectively limited.

The passage formation member is not strictly limited to one having only the shape in which the sectional area increases with distance from the depressurizing space. At least a part of the passage formation member may include a shape expanding outward with distance from the depressurizing space, and the diffuser passage has a shape expanding outward with distance from the depressurizing space according to the shape of the passage formation member.

In addition, the "formed into a conical shape" is not limited to means that the passage formation member is formed into a complete conical shape, but also includes meaning a shape close to cone or a shape partially including the conical shape. Specifically, the cross-sectional shape taken along the axial direction is not limited to an isosceles triangle, but includes a shape in which two sides between which a vertex is sandwiched are convexed inward, a shape in which the two sides between which the vertex is sandwiched are convexed outward, and a shape in which the cross-sectional shape is semicircular.

Further, "to promote a swirling flow of refrigerant flowing through the diffuser passage" is not intended to mean only to promote the swirling flow of refrigerant in an overall region of the diffuser passage extending from an inlet side of the diffuser passage to an outlet side thereof, but also means to promote the swirling flow of at least a part of refrigerant flowing through the diffuser passage (for example, refrigerant on the inlet side of the diffuser passage, refrigerant on the outlet side of the diffuser passage, refrigerant immediately before flowing out of the diffuser passage).

EMBODIMENTS FOR EXPLOITATION OF THE INVENTION

Figure 1:
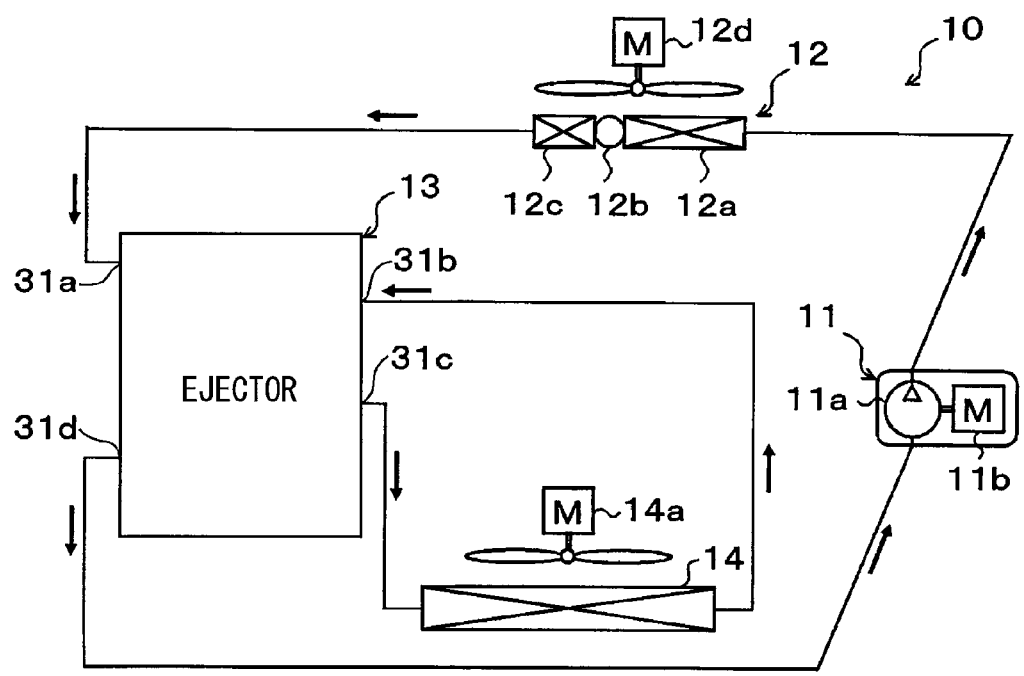
FIG. 1 is a schematic diagram of a refrigeration cycle including an ejector according to a first embodiment.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 5. As illustrated in FIG. 1, an ejector 13 according to this embodiment is applied to a refrigeration cycle device having an ejector as refrigerant depressurizing means, that is, an ejector refrigeration cycle 10. Moreover, the ejector refrigeration cycle 10 is applied to a vehicle air conditioning apparatus, and performs a function of cooling blown air which is blown into a vehicle interior that is a space to be air-conditioned.

First, in the ejector refrigeration cycle 10, a compressor 11 draws a refrigerant, pressurizes the refrigerant to a high pressure refrigerant, and discharges the refrigerant. Specifically, the compressor 11 of this embodiment is an electric compressor in which a fixed-capacity compression mechanism 11a and an electric motor 11b for driving the compression mechanism 11a are accommodated in one housing.

Various compression mechanisms, such as a scroll-type compression mechanism and a vane-type compression mechanism, can be employed as the compression mechanism 11a. Further, the operation (rotating speed) of the electric motor 11b is controlled according to a control signal that is output from a control device to be described below, and any one of an AC motor and a DC motor may be employed as the electric motor 11b.

A refrigerant inlet side of a condenser 12a of a heat radiator 12 is connected to a discharge port of the compressor 11. The heat radiator 12 is a radiation heat exchanger for heat radiation that cools a high-pressure refrigerant, which is discharged from the compressor 11, through the radiation of heat by exchanging heat between the high-pressure refrigerant and vehicle exterior air (outside air) that is blown by a cooling fan 12d.

More specifically, the heat radiator 12 is a so-called subcooling condenser including: a condenser 12a that condenses a high-pressure gas-phase refrigerant, which is discharged from the compressor 11, by exchanging heat between the high-pressure gas-phase refrigerant and the outside air, which is blown from the cooling fan 12d, to radiate the heat of the high-pressure gas-phase refrigerant; a receiver part 12b that separates gas and liquid of the refrigerant having flowed out of the condenser 12a and stores a surplus liquid-phase refrigerant; and a subcooling part 12c that subcools a liquid-phase refrigerant having flowed out of the receiver part 12b by exchanging heat between the liquid-phase refrigerant and the outside air blown from the cooling fan 12d.

Meanwhile, the ejector refrigeration cycle 10 employs an HFC based refrigerant (specifically, R134a) as the refrigerant, and forms a subcritical refrigeration cycle in which a high pressure side refrigerant pressure does not exceed a critical pressure of the refrigerant. The ejector refrigeration cycle 10 may employ an HFO based refrigerant (specifically, R1234yf) or the like as the refrigerant. Furthermore, refrigerator oil for lubricating a compressor 11 is mixed with the refrigerant, and a part of the refrigerator oil circulates in the cycle together with the refrigerant.

The cooling fan 12d is an electric blower of which the rotating speed (the amount of blown air) is controlled by a control voltage output from the control device. A refrigerant inlet port 31a of the ejector 13 is connected to a refrigerant outlet side of the subcooling part 12c of the heat radiator 12.

The ejector 13 functions as refrigerant depressurizing means for depressurizing the high pressure liquid-phase refrigerant of the subcooling state, which flows out from the heat radiator 12, and allowing the refrigerant to flow out to the downstream side, and also functions as refrigerant circulating means (refrigerant transport means) for drawing (transporting) the refrigerant flowing out from an evaporator 14 to be described later by the suction action of a refrigerant flow ejected at high speed to circulate the refrigerant. Further, the ejector 13 according to this embodiment also functions as gas-liquid separation means for separating the depressurized refrigerant into gas and liquid.

A specific configuration of the ejector 13 will be described with reference to FIGS. 2 and 3. Meanwhile, up and down arrows in FIG. 2 indicate, respectively, up and down directions in a state where the ejector refrigeration cycle 10 is mounted on a vehicle air conditioning apparatus. Also, FIG. 3 is a schematic cross-sectional diagram illustrating functions of the respective refrigerant passages of the ejector 13, and the same parts as those in FIG. 2 are denoted by identical symbols.

Figure 2:
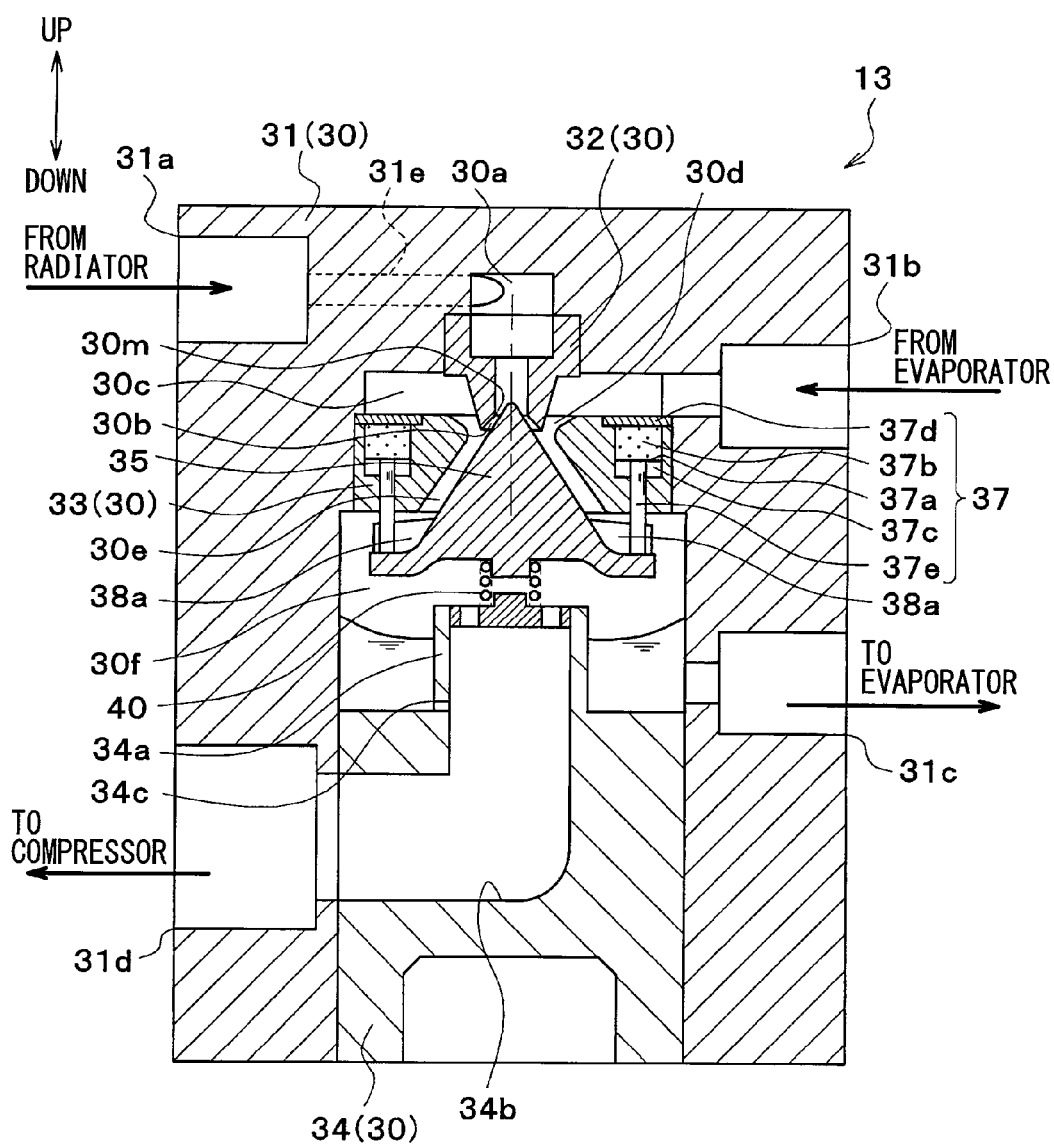
FIG. 2 is a sectional diagram taken along an axis direction of the ejector according to the first embodiment.
Figure 3:
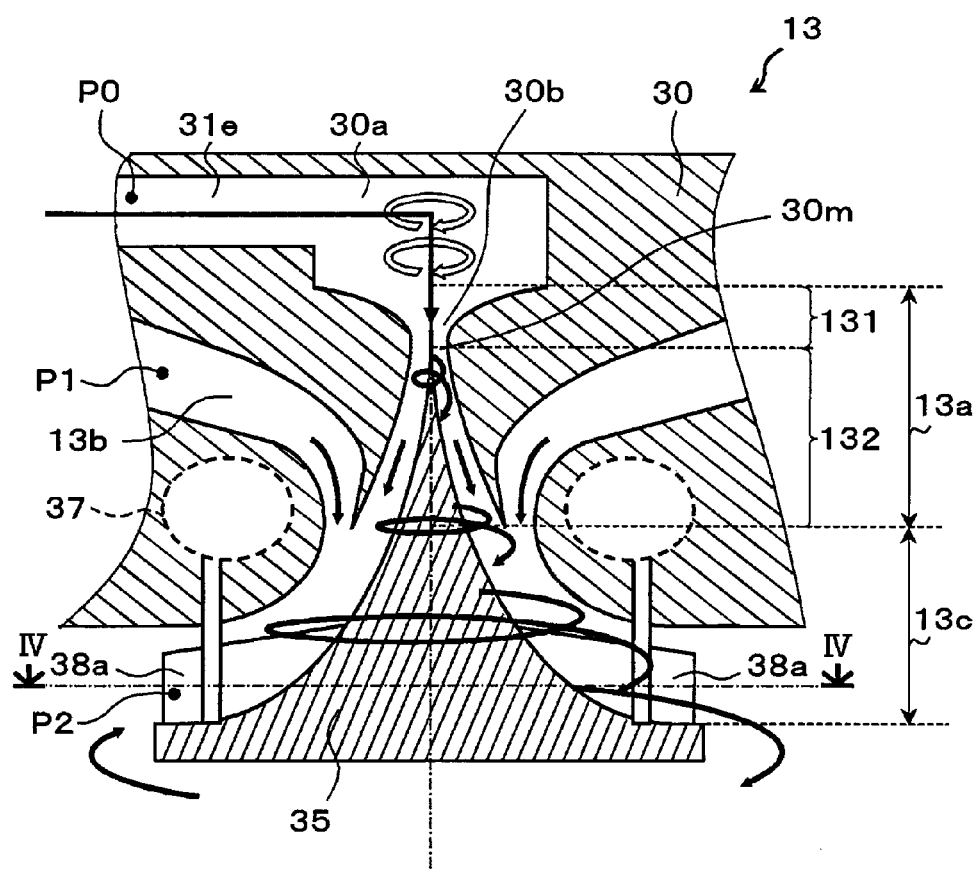
FIG. 3 is a schematic sectional diagram illustrating respective refrigerant passages of the ejector according to the first embodiment.
Figure 4:
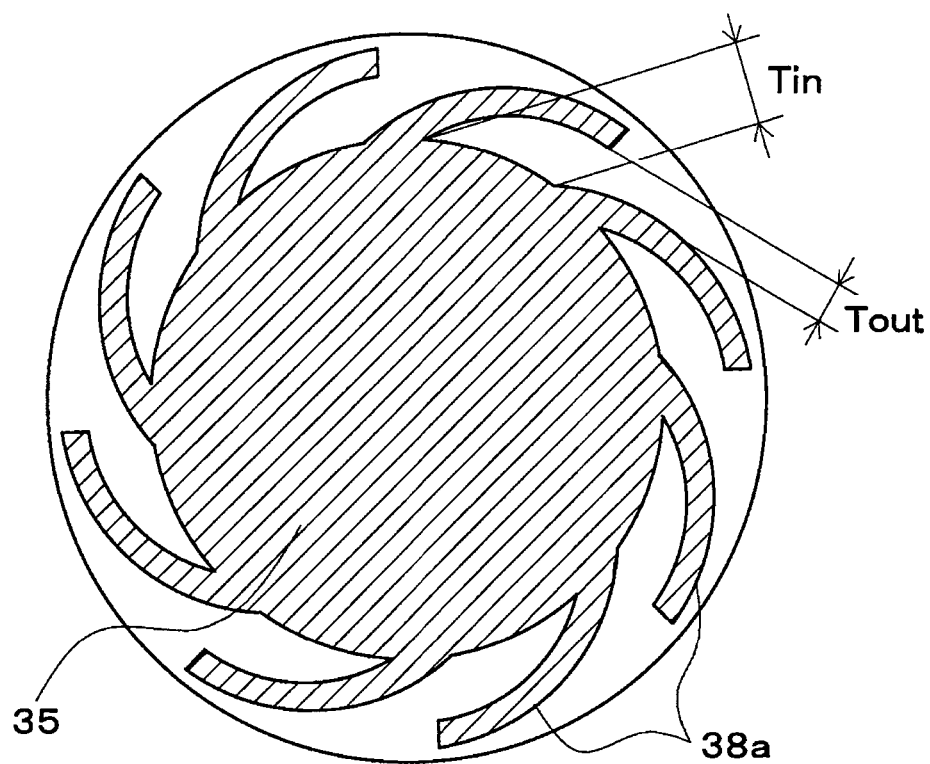
FIG. 4 is a cross-sectional diagram taken along a line IV-IV of FIG. 3.

First, as illustrated in FIG. 2, the ejector 13 according to this embodiment includes a body part 30 configured by the combination of plural components. Specifically, the body part 30 has a housing body 31 made of prismatic-cylindrical or circular-cylindrical metal, and forming an outer shell of the ejector 13. A nozzle body 32, a middle body 33, and a lower body 34 are fixed to an interior of the housing body 31.

The housing body 31 is formed with a refrigerant inlet port 31a through which the refrigerant that has flowed out of the heat radiator 12 flows into the housing body 31, and a refrigerant suction port 31b through which the refrigerant that has flowed out of the evaporator 14 is drawn into the housing body 31. The housing body 31 is also formed with a liquid-phase refrigerant outlet port 31c through which a liquid-phase refrigerant separated by a gas-liquid separation space 30f formed within the body part 30 flows out to the refrigerant inlet side of the evaporator 14, and a gas-phase refrigerant outlet port 31d through which the gas-phase refrigerant separated by the gas-liquid separation space 30f flows out to the suction side of the compressor 11.

The nozzle body 32 is formed of a substantially conically-shaped metal member that is tapered in a refrigerant flow direction. The nozzle body 32 is fixed to the interior of the housing body 31 by means such as press fitting so that an axial direction of the nozzle body 32 is parallel to a vertical direction (up-down direction in FIG. 2). A swirling space 30a in which the refrigerant that has inflows from the refrigerant inlet port 31a is swirled is provided between an upper side of the nozzle body 32 and the housing body 31.

The swirling space 30a is formed into a rotating body shape, and its center axis indicated by an alternate long and short dash line in FIG. 2 extends in the vertical direction. Meanwhile, the rotating body shape is a solid shape formed by rotating a plane figure around one straight line (center axis) coplanar with the plane figure. More specifically, the swirling space 30a according to this embodiment is formed into a substantially cylindrical shape. The swirling space 30a may be formed in a shape in which a circular cone or a circular truncated cone is combined with a cylinder, or the like.

Further, the refrigerant inlet passage 31e that connects the refrigerant inlet port 31a and the swirling space 30a extends in a tangential direction of an inner wall surface of the swirling space 30a when viewed in a center axis direction of the swirling space 30a. With this configuration, the refrigerant that has flowed into the swirling space 30a from the refrigerant inlet passage 31e flows along an inner wall surface of the swirling space 30a, and swirls within the swirling space 30a.

Meanwhile, the refrigerant inlet passage 31e does not need to be formed to completely match the tangential direction of the swirling space 30a when viewed in the center axis direction of the swirling space 30a. If the refrigerant inlet passage 31e includes at least a component in the tangential direction of the swirling space 30a, the refrigerant inlet passage 31e may be formed to include components in the other directions (for example, components in the axial direction of the swirling space 30a).

Here, since a centrifugal force acts on the refrigerant swirling in the swirling space 30a, the pressure of a refrigerant present on the center axis side becomes lower than the pressure of a refrigerant present on the outer peripheral side in the swirling space 30a. Accordingly, in this embodiment, during the normal operation of the ejector refrigeration cycle 10, the pressure of a refrigerant present on the center axis side in the swirling space 30a is lowered to a pressure at which a liquid-phase refrigerant is saturated or a pressure at which a refrigerant is depressurized and boiled (cavitation occurs).

The adjustment of the pressure of a refrigerant present on the center axis side in the swirling space 30a can be realized by adjusting the swirling flow rate of the refrigerant swirling in the swirling space 30a. Further, the adjustment of the swirling flow rate can be conducted by, for example, adjusting an area ratio between the passage sectional area of the refrigerant inlet passage 31e and the sectional area of the swirling space 30a perpendicular to the axial direction. Meanwhile, the swirling flow rate in this embodiment means the flow rate of the refrigerant in the swirling direction in the vicinity of the outermost peripheral part of the swirling space 30a.

A depressurizing space 30b that allows the refrigerant flowing out from the swirling space 30a to be depressurized, and flow out to the downstream side is formed within the nozzle body 32. The depressurizing space 30b is formed into a rotating body shape having a cylindrical space coupled with a circular truncated conical space that gradually expands in a refrigerant flow direction continuously from a lower side of the cylindrical space. A center axis of the depressurizing space 30b is arranged coaxially with the center axis of the swirling space 30a.

Further, a minimum passage area part 30m that is most reduced in the refrigerant passage area within the depressurizing space 30b is formed, and a passage formation member 35 that changes the passage area of the minimum passage area part 30m is arranged, within the depressurizing space 30b. The passage formation member 35 is formed into a substantially conical shape gradually widened toward the downstream side of the refrigerant flow, and the center axis of the passage formation member 35 is arranged coaxially with the center axis of the depressurizing space 30b. In other words, the passage formation member 35 is formed into a conical shape having a cross-sectional area that increases with distance from the depressurizing space 30b.

The refrigerant passage is formed between an inner peripheral surface of a portion of the nozzle body 32 which defines the depressurizing space 30b and an outer peripheral surface of the upper side of the passage formation member 35. As illustrated in FIG. 3, the refrigerant passage includes a convergent part 131 and a divergent part 132. A convergent part 131 is formed on the upstream side of a minimum passage area part 30m in the refrigerant flow, in which the refrigerant passage area extending to the minimum passage area part 30m gradually decreases. A divergent part 132 is formed on the downstream side of the minimum passage area part 30m in the refrigerant flow, in which the refrigerant passage area gradually increases.

In the divergent part 132, since the depressurizing space 30b overlaps (overlaps) with the passage formation member 35 when viewed from the radial direction, a sectional shape of the refrigerant passage perpendicular to the axis direction is annular (doughnut shape obtained by removing a smaller-diameter circular shape arranged coaxially from the circular shape). Further, since a spread angle of the passage formation member 35 of this embodiment is smaller than a spread angle of the circular truncated conical space of the depressurizing space 30b, the refrigerant passage area of the divergent part 132 gradually enlarges toward the downstream side in the refrigerant flow.

In this embodiment, the refrigerant passage formed between the inner peripheral surface of the depressurizing space 30b and the outer peripheral surface of a top side of the passage formation member 35 is a nozzle passage 13a that functions as a nozzle. The nozzle passage 13a depressurizes the refrigerant, and also accelerates the flow rate of the refrigerant to the sonic speed, and jets the refrigerant. Further, since the refrigerant flowing into the nozzle passage 13a swirls in the swirling space 30a, the refrigerant flowing through the nozzle passage 13a, and the jet refrigerant that is jetted from the nozzle passage 13a also have a velocity component in a direction of swirling in the same direction as that of the refrigerant swirling in the swirling space 30a.

Subsequently, as illustrated in FIG. 2, the middle body 33 is formed of a disc-shaped member made of metal having a through-hole of a rotating body shape which penetrates through both sides thereof in the center part thereof. The middle body 33 accommodates a driving means 37 that displaces the passage formation member 35 on an outer peripheral side of the through-hole. Meanwhile, a center axis of the through-hole is arranged coaxially with the center axes of the swirling space 30a and the depressurization space 30b. Also, the middle body 33 is fixed to the interior of the housing body 31 and the lower side of the nozzle body 32 by means such as press fitting.

Further, an inflow space 30c is formed between an upper surface of the middle body 33 and an inner wall surface of the housing body 31 facing the middle body 33, and the inflow space 30c accumulates the refrigerant that has flowed out of a refrigerant suction port 31b. Meanwhile, in this embodiment, because a tapered tip of a lower end of the nozzle body 32 is located within the through-hole of the middle body 33, the inflow space 30c is formed into an annular cross-sectional shape when viewed in the center axis direction of the swirling space 30a and the depressurization space 30b.

The through-hole of the middle body 33 has a part in which a refrigerant passage area is gradually reduced toward the refrigerant flow direction so as to match an outer peripheral shape of the tapered tip of the nozzle body 32 in an area where the lower side of the nozzle body 32 is inserted, that is, an area in which the middle body 33 and the nozzle body 32 overlap with each other when viewed in a radial direction perpendicular to the axis line.

Accordingly, a suction passage 30d is formed between an inner peripheral surface of the through-hole and an outer peripheral surface of the lower side of the nozzle body 32, and the inflow space 30c communicates with a downstream side of the depressurizing space 30b in the refrigerant flow through the suction passage 30d. That is, in this embodiment, the inflow space 30c and the suction passage 30d configures a suction passage 13b through which the suction refrigerant flows from the radially outer side toward the radially inner side with respect to the center axis. Further, a cross-section of the suction passage 13b perpendicular to the center axis also has an annular cross-sectional shape.

Also, a pressurizing space 30e formed into a substantially circular truncated conical shape that is gradually widened in the refrigerant flow direction is formed in the through-hole of the middle body 33 on the downstream side of the suction passage 30d in the refrigerant flow. The pressurizing space 30e is a space in which the ejected refrigerant ejected from the above-mentioned nozzle passage 13a is mixed with the suction refrigerant drawn from the suction passage 30d.

The lower side of the above-mentioned passage formation member 35 is located in the pressurizing space 30e. Further, a spread angle of the conical-shaped side surface of the passage formation member 35 in the pressurizing space 30e is smaller than a spread angle of the circular truncated conical space of the pressurizing space 30e. Therefore, the refrigerant passage area of the refrigerant passage is gradually enlarged toward the downstream side in the refrigerant flow.

In this embodiment, the refrigerant passage area is enlarged as above. Thus, the refrigerant passage, which is formed between the inner peripheral surface of the middle body 33 and the outer peripheral surface of the lower side of the passage formation member 35 and configures the pressurizing space 30e, is defined as a diffuser passage 13c which functions as a diffuser. The diffuser passage 13c converts velocity energies of a mixed refrigerant of the jet refrigerant and the suction refrigerant into a pressure energy.

That is, in the diffuser passage 13c, the jet refrigerant and the suction refrigerant are mixed together, and pressurized.

Further, a cross-section of the diffuser passage 13c perpendicular to the center axis also has an annular shape. As schematically illustrated in FIG. 3, the refrigerant that flows through the diffuser passage 13c also has a velocity component in a direction of swirling in the same direction as that of the refrigerant swirling in the swirling space 30a.

In this embodiment, plural flow regulation plates 38a are provided as an example of a swirling promotion part that promotes the swirling of refrigerant flowing through the diffuser passage 13c. Those flow regulation plates 38a are arranged in a portion of the passage formation member 35 that defines the refrigerant outlet of the diffuser passage 13c on an outer peripheral side of a lowermost part of the passage formation member 35. The flow regulation plates 38a are each formed of a plate member spread in the axial direction of the passage formation member 35, and as illustrated in a cross-sectional view taken along a line IV-IV in FIG. 4, the flow regulation plates 38a are arranged radially around the axis of the passage formation member 35.

Furthermore, the flow regulation plates 38a are each formed in a curved shape along the swirling flowing direction when viewed from the axial direction. The respective flow regulation plates 38a are arranged in an accelerating cascade (acceleration cascade arrangement) in which an interval Tout between the respective flow regulation plates 38a on the refrigerant flow outlet side is narrower than an interval Tin between the respective flow regulation plates 38a on the inlet side. In this embodiment, the intervals between the respective flow regulation plates 38a are narrowed from the inlet side toward the outlet side, and the passage cross-sectional areas of the refrigerant passages formed between the adjacent flow regulation plates 38a are gradually reduced, to thereby promote the swirling flow while accelerating the flow rate of the swirling component of the refrigerant.

Next, the driving means 37 that is arranged within the middle body 33 and displaces the passage formation member 35 will be described. The driving means 37 is configured with a circular laminated diaphragm 37a which is a pressure responsive member. More specifically, as illustrated in FIG. 2, the diaphragm 37a is fixed by means such as welding so as to partition a cylindrical space formed on the outer peripheral side of the middle body 33 into two upper and lower spaces.

The upper space (the inflow space 30c side) of the two spaces partitioned by the diaphragm 37a configures a sealed space 37b in which a temperature sensitive medium is enclosed. A pressure of the temperature sensitive medium changes according to a temperature of the refrigerant flowing out of the evaporator 14. The temperature sensitive medium, which has the same composition as that of a refrigerant circulating in the ejector refrigeration cycle 10, is enclosed in the sealed space 37b so as to have a predetermined density. Accordingly, the temperature sensitive medium of this embodiment is R134a.

On the other hand, the lower space of the two spaces partitioned by the diaphragm 37a configures an introduction space 37c into which the refrigerant flowing out of the evaporator 14 is introduced through a non-shown communication channel. Therefore, the temperature of the refrigerant flowing out of the evaporator 14 is transmitted to the temperature sensitive medium enclosed in the sealed space 37b via a cap member 37d and the diaphragm 37a. The cap member 37d partitions the inflow space 30c and the sealed space 37b.

In this example, as apparent from FIGS. 2 and 3, the suction passage 13b is arranged on the upper side of the middle body 33 in this embodiment, and the diffuser passage 13c is arranged on the lower side of the middle body 33. Therefore, at least a part of the driving means 37 is arranged at a position sandwiched by the suction passage 13b and the diffuser passage 13c from the vertical direction when viewed from the radial direction of the axis line.

In more detail, the sealed space 37b of the driving means 37 is arranged at a position where the suction passage 13b overlaps with the diffuser passage 13c and at a position surrounded by the suction passage 13b and the diffuser passage 13c when viewed from a center axis direction of the swirling space 30a and the passage formation member 35. With this configuration, the temperature of the refrigerant flowing out of the evaporator 14 is transmitted to the sealed space 37b, and an internal pressure within the sealed space 37b becomes a pressure corresponding to the temperature of the refrigerant flowing out of the evaporator 14.

Further, the diaphragm 37a is deformed according to a differential pressure between the internal pressure of the sealed space 37b and the pressure of the refrigerant which has flowed into the introduction space 37c from the evaporator 14. For that reason, it is preferable that the diaphragm 37a is made of a material rich in elasticity, excellent in heat conduction, and tough. For example, it is desirable that the diaphragm 37a is formed of a metal laminate made of stainless steel (SUS304).

An upper end side of a cylindrical actuating bar 37e joined to a center part of the diaphragm 37a by means such as welding, and a lower end side of the actuating bar 37e is fixed to a radially-outer and lowermost (bottom) part of the passage formation member 35. With this configuration, the diaphragm 37a and the passage formation member 35 are coupled with each other, and the passage formation member 35 is displaced in accordance with a displacement of the diaphragm 37a to regulate the refrigerant passage area of the nozzle portion 13a in the minimum passage area part 30m.

Specifically, when the temperature (the degree of superheat) of the refrigerant following out of the evaporator 14 rises, a saturated pressure of the temperature sensitive medium enclosed in the sealed space 37b rises to increase a differential pressure obtained by subtracting the pressure of the introduction space 37c from the internal pressure of the sealed space 37b. Accordingly, the diaphragm 37a displaces the passage formation member 35 in a direction of enlarging the refrigerant passage area in the minimum passage area part 30m (downward in the vertical direction).

On the other hand, when the temperature (the degree of superheat) of the refrigerant flowing out of the evaporator 14 falls, a saturated pressure of the temperature sensitive medium sealed in the sealed space 37b falls to decrease the differential pressure obtained by subtracting the pressure of the introduction space 37c from the internal pressure of the sealed space 37b. With the above configuration, the diaphragm 37a displaces the passage formation member 35 in a direction of reducing the refrigerant passage area of the minimum passage area part 30m (toward the upper side in the vertical direction).

The diaphragm 37a displaces the passage formation member 35 according to the degree of superheating of the refrigerant flowing out of the evaporator 14 as described above. As a result, the refrigerant passage area of the minimum passage area part 30m is adjusted so that the degree of superheating of the refrigerant present on the outlet side of the evaporator 14 comes closer to a predetermined value. A gap between the actuating bar 37e and the middle body 33 is sealed by a seal member such as an O-ring not shown, and the refrigerant is not leaked through the gap even if the actuating bar 37e is displaced.

The bottom of the passage formation member 35 is subjected to a load of a coil spring 40 fixed to the lower body 34. The coil spring 40 applies a load to the passage formation member 35, and the load is urged against the passage formation member 35 so as to reduce the refrigerant passage area in the minimum passage area part 30m. With the regulation of this load, a valve opening pressure of the passage formation member 35 can also be changed to change a target degree of superheat.

Further, in this embodiment, the multiple (specifically, two) cylindrical spaces are provided in the part of the middle body 33 on the radially outer side, and the respective circular laminated diaphragms 37a are fixed in those spaces to configure two driving means 37. However, the number of driving means 37 is not limited to this number. When the driving means 37 is provided at plural locations, it is desirable that the driving means 37 is arranged at regular angular intervals with respect to the respective center axes.

Alternatively, a diaphragm formed of the annular thin plate may be fixed in a space having an annular shape when viewed from the axial direction, and the diaphragm and the passage formation member 35 may be coupled with each other by multiple actuating bars.

Next, the lower body 34 is formed of a circular-cylindrical metal member, and fixed in the housing body 31 by means such as screwing so as to close a bottom of the housing body 31. The gas-liquid separation space 30f that separates gas and liquid of the refrigerant that has flowed out of the above-mentioned diffuser passage 13c from each other is formed between the upper side of the lower body 34 and the middle body 33.

The gas-liquid separation space 30f is formed as a space of a substantially cylindrical rotating body shape, and the center axis of the gas-liquid separation space 30f is also arranged coaxially with the center axes of the swirling space 30a and the depressurization space 30b.

As described above, the refrigerant flows in the diffuser passage 13c along the refrigerant passage having an annular cross-section shape while swirling. Therefore, the refrigerant that flows from the diffuser passage 13c into the gas-liquid separation space 30f also has a velocity component in the swirling direction. Therefore, the gas and liquid of refrigerant are separated by the action of the centrifugal force within the gas-liquid separation space 30f. In addition, an internal volume of the gas-liquid separation space 30f has a volume insufficient to substantially accumulate excess refrigerant even if a load variation occurs in the cycle and the refrigerant circulation flow rate circulating in the cycle is varied.

A cylindrical pipe 34a that is arranged coaxially with the gas-liquid separation space 30f and extends upward is disposed in the center part of the lower body 34. The liquid-phase refrigerant separated by the gas-liquid separation space 30f is temporarily retained on the outer peripheral side of the pipe 34a, and flows out of the liquid-phase refrigerant outlet port 31c. Also, a gas-phase refrigerant outflow passage 34b is formed inside the pipe 34a and guides the gas-phase refrigerant separated in the gas-liquid separation space 30f to a gas-phase refrigerant outlet port 31d of the housing body 31.

Further, the above-mentioned coil spring 40 is fixed to an upper end of the pipe 34a. The coil spring 40 also functions as a vibration absorbing member that attenuates the vibration of the passage formation member 35, which is caused by a pressure pulsation generated when the refrigerant is depressurized. Additionally, an oil return hole 34c that returns a refrigerator oil in the liquid-phase refrigerant into the compressor 11 through the gas-phase refrigerant outflow passage 34b is formed on a base part (lowermost part) of the pipe 34a.

The liquid-phase refrigerant outlet port 31c of the ejector 13 is connected with an inlet side of the evaporator 14 as illustrated in FIG. 1. The evaporator 14 is a heat exchanger for absorbing heat that evaporates a low-pressure refrigerant depressurized by the ejector 13 and performs a heat absorbing action by exchanging heat between the low-pressure refrigerant and air that is blown into the vehicle interior from a blower fan 14a.

The blower fan 14a is an electric blower of which the rotation speed (the amount of blown air) is controlled by a control voltage output from the control device. An outlet side of the evaporator 14 is connected with the refrigerant suction port 31b of the ejector 13. Further, the gas-phase refrigerant outlet port 31d of the ejector 13 is connected with the suction side of the compressor 11.

Next, the control device (not shown) includes a well-known microcomputer including a CPU, a ROM and a RAM, and peripheral circuits of the microcomputer. The control device controls the operations of the above-mentioned various electric actuators 11b, 12d, and 14a and the like by performing various calculations and processing on the basis of a control program stored on the ROM.

Further, a sensor group for controlling air conditioning, such as an inside air-temperature sensor for detecting the temperature of air present in the vehicle interior, an outside air-temperature sensor for detecting the temperature of outside air, a solar radiation sensor for detecting the quantity of solar radiation in the vehicle interior, an evaporator-temperature sensor for detecting the blow-out air temperature from the evaporator 14 (the temperature of the evaporator), an outlet-side temperature sensor for detecting the temperature of a refrigerant on the outlet side of the heat radiator 12, and an outlet-side pressure sensor for detecting the pressure of a refrigerant present on the outlet side of the heat radiator 12, is connected to the control device. Accordingly, detection values of the sensor group are input to the control device.

Furthermore, an operation panel (not shown), which is disposed near a dashboard panel positioned at the front part in the vehicle interior, is connected to the input side of the control device, and operation signals output from various operation switches mounted on the operation panel are input to the control device. An air conditioning operation switch that is used to perform air conditioning in the vehicle interior, a vehicle interior temperature setting switch that is used to set the temperature of air present in the vehicle interior, and the like are provided as the various operation switches that are mounted on the operation panel.

Meanwhile, the control device of this embodiment is integrated with control means for controlling the operations of various control target devices connected to the output side of the control device, but structure (hardware and software), which controls the operations of the respective control target devices, of the control device forms control means of the respective control target devices. For example, structure (hardware and software), which controls the operation of the electric motor 11b of the compressor 11, forms discharge capability control means in this embodiment.

Next, the operation of this embodiment having the above-mentioned configuration will be described with reference to a Mollier diagram of FIG. 5. The axis of ordinate in the Mollier diagram represents a pressure corresponding to P0, P1, and P2 in FIG. 3. First, when an operation switch of the operation panel is turned on, the control device operates the electric motor 11b of the compressor 11, the cooling fan 12d, and the blower fan 14a, and the like. Accordingly, the compressor 11 draws and compresses a refrigerant and discharges the refrigerant.

The gas-phase refrigerant (point a5 in FIG. 5), which is discharged from the compressor 11 and has a high temperature and a high pressure, flows into the condenser 12a of the heat radiator 12 and is condensed by exchanging heat between the air (outside air), which is blown from the cooling fan 12d, and itself and by radiating heat. The refrigerant, which has radiated heat in the condenser 12a, is separated into gas and liquid in the receiver part 12b. A liquid phase refrigerant, which has been subjected to gas-liquid separation in the receiver part 12b, is changed into a subcooled liquid phase refrigerant by exchanging heat between the air, which is blown from the cooling fan 12d, and itself in the subcooling part 12c and further radiating heat (from point a5 to point b5 in FIG. 5).

Figure 5:
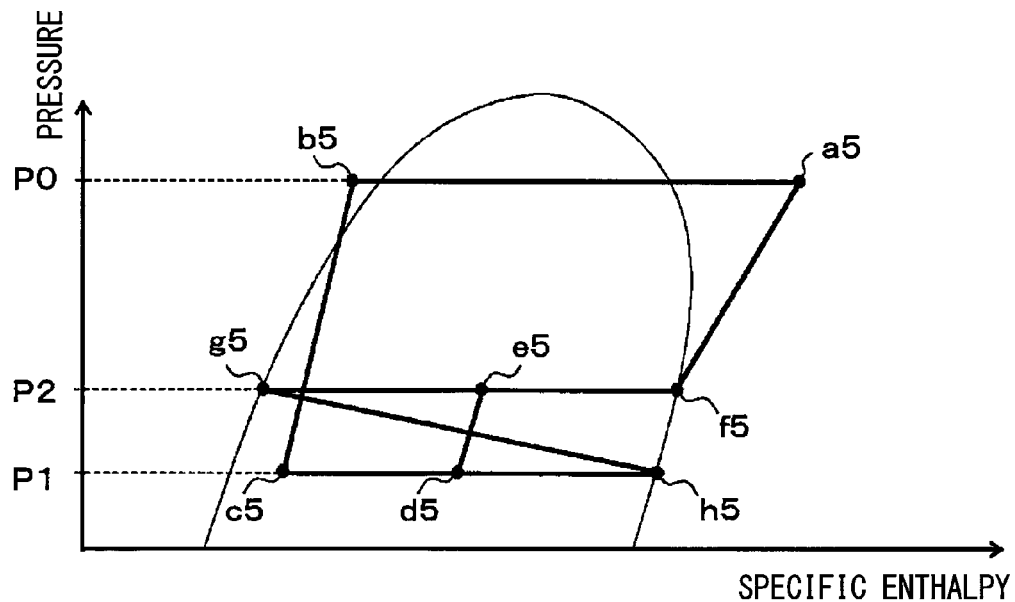
FIG. 5 is a Mollier diagram illustrating a state of a refrigerant in the refrigeration cycle including the ejector according to the first embodiment.

The subcooled liquid-phase refrigerant that has flowed out of the subcooling part 12c of the heat radiator 12 is isoentropically depressurized by the nozzle passage 13a, and ejected (from point b5 to point c5 in FIG. 5). The nozzle passage 13c is formed between the inner peripheral surface of the depressurization space 30b of the ejector 13 and the outer peripheral surface of the passage formation member 35. In this situation, the refrigerant passage area of the depressurization space 30b in the minimum passage area part 30m is regulated so that the degree of superheating of the refrigerant on the outlet side of the evaporator 14 comes close to a predetermined given value.

The refrigerant that has flowed out of the evaporator 14 is drawn through the refrigerant suction port 31b and the suction passage 13b (the inflow space 30c, and the suction passage 30d) due to the suction action of the jet refrigerant which has been jetted from the nozzle passage 13a. In addition, the jet refrigerant jetted from the nozzle passage 13a and the suction refrigerant drawn through the suction passage 13b and the like flow into the diffuser passage 13c (from point c5 to point d5, and from point h5 to point d5 in FIG. 5).

In the diffuser passage 13c, the velocity energy of the refrigerant is converted into the pressure energy due to the enlarged refrigerant passage area. As a result, the mixed refrigerant is pressurized while the jet refrigerant and the suction refrigerant are mixed together (from point d5 to point e5 in FIG. 5). The refrigerant that flowed out of the diffuser passage 13c is separated into gas and liquid in the gas-liquid separation space 30f (from point e5 to point f5, and from point e5 to point g5 in FIG. 5).

The liquid-phase refrigerant that has been separated in the gas-liquid separation space 30f flows out of the liquid-phase refrigerant outlet port 31c, and flows into the evaporator 14. The refrigerant having flowed into the evaporator 14 absorbs heat from the air blown by the blower fan 14a, and evaporates, and the blown air is cooled (point g5 to point h5 in FIG. 5). On the other hand, the gas-phase refrigerant that has been separated in the gas-liquid separation space 30f flows out of the gas-phase refrigerant outlet port 31d, and again drawn into the compressor 11 to be decompressed (point f5 to point a5 in FIG. 5).

The ejector refrigeration cycle 10 according to this embodiment operates as described above, and can cool the blown air to be blown into the vehicle interior. Further, in the ejector refrigeration cycle 10, since the refrigerant pressurized by the diffuser passage 13c is drawn into the compressor 11, the drive power of the compressor 11 can be reduced to improve the cycle of performance (COP).

Further, according to the ejector 13 of this embodiment, the refrigerant swirls in the swirling space 30a with the results that a refrigerant pressure on a swirling center side in the swirling space 30a can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space 30a, and has a liquid single phase around the vicinity thereof.

The refrigerant that has become in the two-phase separation state as described above flows into the nozzle passage 13a. As a result, in the convergent part 131 of the nozzle passage 13a, boiling of the refrigerant is promoted by the wall boiling generated when the refrigerant is separated from the outer peripheral side wall surface of the annular refrigerant passage, and the interface boiling caused by a boiling nuclear generated by the cavitation of the refrigerant on the center axis side of the annular refrigerant passage. Accordingly, the refrigerant that flows into the minimum passage area part 30m of the nozzle passage 13a becomes in a gas-liquid mixed state in which the gas phase and the liquid phase are uniformly mixed together.

The flow of the refrigerant in the gas-liquid mixed state is blocked (choked) in the vicinity of the minimum passage area part 30m. The refrigerant in the gas-liquid mixed state which reaches the sonic speed by the choking is accelerated in the divergent part 132, and ejected. As described above, the refrigerant of the gas-liquid mixed state can be efficiently accelerated to the sonic speed by the boiling promotion caused by both of the wall surface boiling and the interface boiling. As a result, the energy conversion efficiency (corresponding to the nozzle efficiency in the conventional art) in the nozzle passage 13a can be improved.

In addition, the ejector 13 of this embodiment employs the passage formation member 35 having a conical shape of which a cross-sectional area increases with distance from the depressurizing space 30b. The cross-sectional shape of the diffuser passage 13c is formed in an annular shape. Therefore, the diffuser passage 13c can have a shape to expand along the outer periphery of the passage formation member 35 with distance from the depressurizing space 30b, and the refrigerant flowing through the diffuser passage 13c can be swirled.

With the above configuration, since the flow channel for pressurizing the refrigerant can be formed into the spiral shape in the diffuser passage 13c, enlargement of the dimension of the diffuser passage 13c in the axial direction (the axial direction of the passage formation member 35) can be limited as compared with a case in which the diffuser portion is shaped to extend in the axial direction of the nozzle portion as in a conventional art. As a result, the upsizing of the body of the overall ejector 13 can be limited.

In addition, in the ejector 13 of this embodiment, since the flow regulation plate 38a is provided as an example of the swirling promotion part, even if, for example, the flow rate of refrigerant circulating in the ejector refrigeration cycle 10 is reduced due to the load variation, a reduction in the velocity of refrigerant flowing through the diffuser passage 13c in the swirling direction can be restricted. Therefore, a reduction in the spiral refrigerant flow channel for pressurizing the refrigerant in the diffuser passage 13c is restricted, thereby being capable of suppressing a reduction in the pressurizing amount of refrigerant in the diffuser passage 13c.

That is, according to the ejector 13 of this embodiment, the high energy conversion efficiency (corresponding to the nozzle efficiency in the conventional art) can be achieved in the nozzle passage 13a regardless of the load variations of the ejector refrigeration cycle 10 without upsizing the body. Further, the high pressurizing performance can be performed by the diffuser passage 13c.

Further, in the ejector 13 of this embodiment, since the plural flow regulation plates 38a are arranged in the accelerating cascade when viewed from the axial direction of the passage formation member 35, the flow rate of the swirling component of the refrigerant can be accelerated to efficiently promote the swirling flow. As a result, a reduction in the centrifugal force acting on the refrigerant which has flowed out of the diffuser passage 13c, and flowed into the gas-liquid separation space 30f can be restricted. Also, a reduction in the gas-liquid separation performance in the gas-liquid separation space 30f can be restricted.

In the ejector 13 according to this embodiment, since the driving means 37 is provided, the passage formation member 35 can be displaced in accordance with a load variation of the ejector refrigeration cycle 10 to regulate the refrigerant passage areas of the nozzle passage 13a and the diffuser passage 13c. Therefore, the ejector 13 can appropriately operate according to the load variation of the ejector refrigeration cycle 10.

Further, since the sealed space 37b in which a temperature sensitive medium is enclosed in the driving means 37 is arranged at a position sandwiched between the suction passage 13b and the diffuser passage 13c, a space formed between the suction passage 13b and the diffuser passage 13c can be effectively utilized. As a result, the upsizing of the body of the overall ejector 13 can be further restricted.

Moreover, since the sealed space 37b is arranged at the position surrounded by the suction passage 13b and the diffuser passage 13c, the temperature of the refrigerant flowing out of the evaporator 14, of the refrigerant flowing through the suction passage 13b is excellently transmitted to the temperature sensitive medium without being affected by an outside air temperature, and the pressure in the sealed space 37b can be changed accordingly. That is, the pressure within the sealed space 37b can be changed with high precision depending on the temperature of the outflow refrigerant from the evaporator 14.

Also, the gas-liquid separation space 30f that separates gas and liquid of the refrigerant that has flowed out of the diffuser passage 13c is formed in the body part 30 of the ejector 13 according to this embodiment. Hence, the capacity of the gas-liquid separation space 30f can be effectively reduced as compared with a case in which gas-liquid separating means is provided in addition to the ejector 13.

That is, in the gas-liquid separation space 30f according to this embodiment, since the refrigerant that flows out of the diffuser passage 13c has been already swirled, there is no need to provide a space for generating or growing the swirling flow of the refrigerant in the gas-liquid separation space 30f. Therefore, the capacity of the gas-liquid separation space 30f can be effectively reduced as compared with the case in which the gas-liquid separating device is provided apart from the ejector 13.

Second Embodiment

Figure 6:
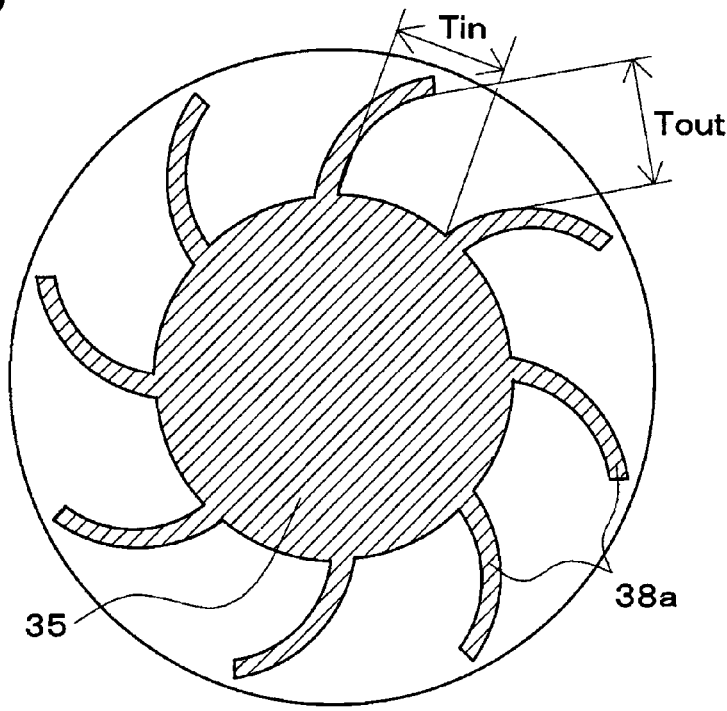
FIG. 6 is a schematic cross-sectional diagram of a passage formation member according to a second embodiment.

In this embodiment, a description will be given of an example in which the arrangement mode of a flow regulation plates 38a is changed as illustrated in the cross-sectional view of FIG. 6 with respect to the first embodiment. FIG. 6 is a drawing corresponding to FIG. 2 of the first embodiment. Specifically, the flow regulation plates 38a according to this embodiment are arranged in a decelerating cascade in which an interval Tout between the respective flow regulation plates 38a on the refrigerant flow outlet side is wider than an interval Tin between the respective flow regulation plates 38a on the inlet side. In this embodiment, the intervals between the respective flow regulation plates 38a are made wider toward the outlet side from the inlet side.

With the above configuration, in this embodiment, the flow rate of the refrigerant flowing out of a diffuser passage 13c in the swirling direction is slightly reduced, but the passage cross-sectional area of the refrigerant passage formed between the adjacent flow regulation plates 38a is gradually increased, and can function as a diffuser that converts a velocity energy of the refrigerant into a pressure energy.

As a result, not only the same advantages as those in the first embodiment can be obtained, but also the reduction in the pressurizing amount of refrigerant in the diffuser passage 13c can be effectively restricted.

Third Embodiment

Figure 7:
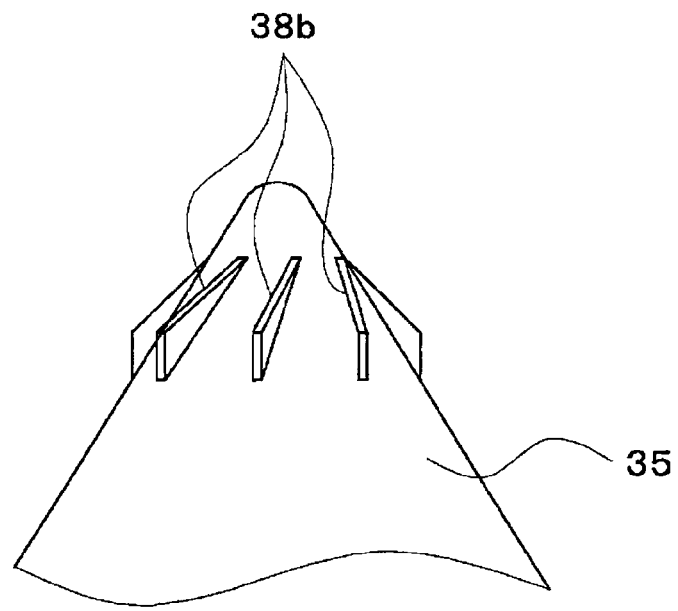
FIG. 7 is a side view illustrating a part of a passage formation member according to a third embodiment.
Figure 8:
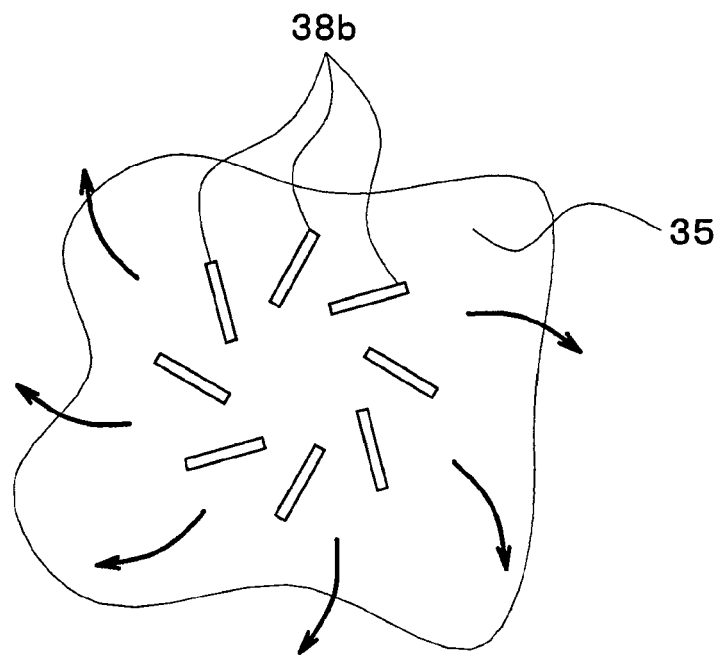
FIG. 8 is a top view illustrating a part of the passage formation member according to the third embodiment.

In this embodiment, a description will be given of an example in which plural flow regulation plates 38b are arranged on a top side of a passage formation member 35 having a conical shape to configure a swirling promotion part as illustrated in FIGS. 7 and 8. FIG. 7 is an enlarged front view of the top side of the single passage formation member 35 when viewed from a direction (horizontal direction) perpendicular to the axial direction, and FIG. 8 is an enlarged front view of the single passage formation member 35 when viewed from a top side (upper side) in the axial direction.

The flow regulation plate 38b is configured by a flat plate member arranged in a portion (more specifically, a portion in which a divergent part 132 is formed) in which a nozzle passage 13a is formed in an outer peripheral surface of the passage formation member 35. Further, as illustrated in FIG. 8, a plate surface of the passage formation member 35 is arranged radially around an axis of the passage formation member 35 in a state where the plate surface is inclined with respect to the radial direction when viewed from the axial direction thereof. As a result, the flow of refrigerant is led to a swirling direction (direction around the axis) to promote the swirling flow of refrigerant flowing in the diffuser passage 13c.

The other configurations and operation of the ejector refrigeration cycle 10 and the ejector 13 are identical with those in the first embodiment. Accordingly, the same advantages as those in the first embodiment can be obtained even in the ejector 13 of this embodiment.

That is, even when the swirling promotion part is configured by the plural flow regulation plates 38b arranged on the top side of the passage formation member 35 as in the ejector 13 of this embodiment, the reduction in the flow rate of the refrigerant flowing in the diffuser passage 13c in the swirling direction can be suppressed in reducing the flow rate of refrigerant circulating in the ejector refrigeration cycle 10.

As a result, as with the first embodiment, the high energy conversion efficiency (corresponding to the nozzle efficiency in the conventional art) can be achieved in the nozzle passage 13a regardless of the load variations of the ejector refrigeration cycle 10 without upsizing the body. Further, the high pressurizing performance can be performed by the diffuser passage 13c.

In this embodiment, the example in which the plural flow regulation plates 38b are arranged on the top side of the passage formation member 35 is described. Alternatively, the plural flow regulation plates 38b may be arranged in a portion defining the nozzle passage 13a (more specifically, a portion defining the divergent part 132 of the nozzle body 32) in the inner peripheral surface of the body part 30, or the plural flow regulation plates 38b may be arranged in both of the passage formation member 35 and the nozzle body 32.

Fourth Embodiment

Figure 9:
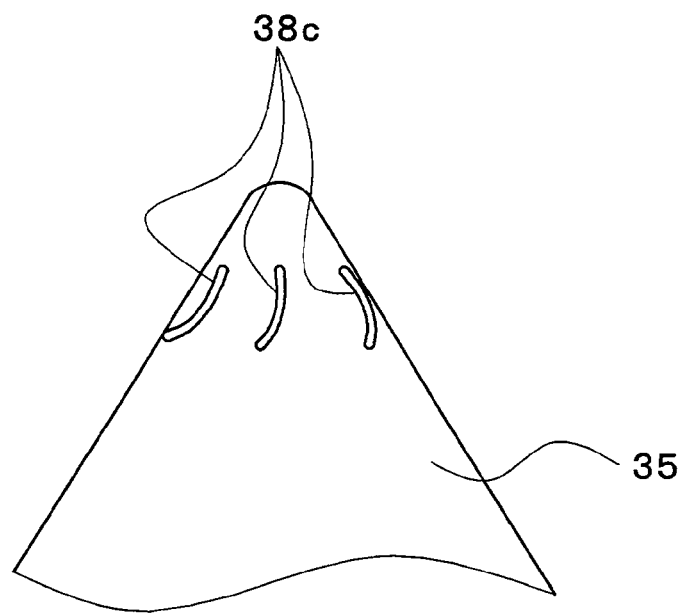
FIG. 9 is a side view illustrating a part of a passage formation member according to a fourth embodiment.
Figure 10:
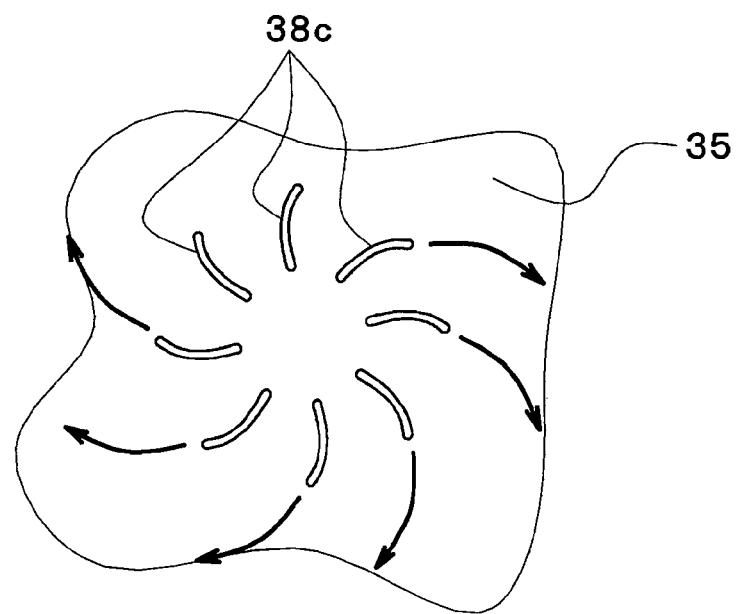
FIG. 10 is a top view illustrating a part of the passage formation member according to the fourth embodiment.

In this embodiment, a description will be given of an example in which a swirling promotion part is configured by forming plural grooves 38c on a top side of a passage formation member 35 having a conical shape as illustrated in FIGS. 9 and 10 instead of the flow regulation plates 38a of the third embodiment. FIGS. 9 and 10 are diagrams corresponding to FIGS. 7 and 8, respectively.

The grooves 38c are disposed on a portion of the outer peripheral surface of the passage formation member 35 that defines the nozzle passage 13a (more specifically, a portion defining the divergent part 132). As illustrated in FIG. 10, the grooves 38c extend to be curved along the swirling flowing direction when viewed from an axial direction of the passage formation member 35. With this shape, the flow of refrigerant is led in the swirling direction to promote the swirling flow of refrigerant flowing in the diffuser passage 13c.

The other configurations and operation of the ejector refrigeration cycle 10 and the ejector 13 are identical with those in the third embodiment. As with the ejector 13 of this embodiment, even if the swirling promotion part is configured by the plural grooves 38c formed on the top side of the passage formation member 35, the same advantages as those in the third embodiment can be obtained.

In this embodiment, the example in which the plural grooves 38c are arranged on the top side of the passage formation member 35 is described. Alternatively, the plural grooves 38c may be formed on a portion of the inner peripheral surface of the body part 30 that defines the nozzle passage 13a (more specifically, a portion defining the divergent part 132 of the nozzle body 32), or the plural grooves 38c may be formed in both of the passage formation member 35 and the nozzle body 32.

Fifth Embodiment

Figure 11:
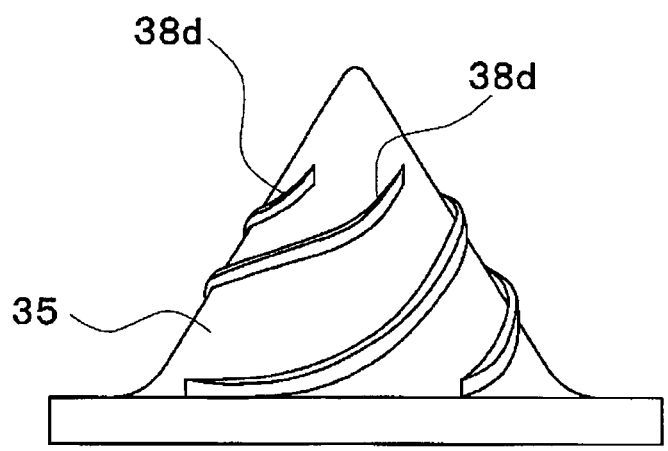
FIG. 11 is a side view illustrating a passage formation member according to a fifth embodiment.
Figure 12:
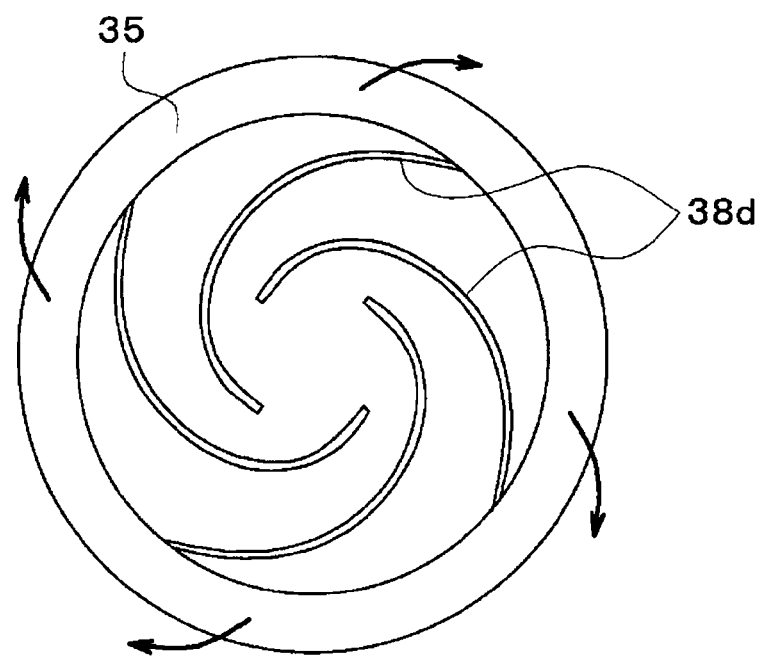
FIG. 12 is a top view illustrating the passage formation member according to the fifth embodiment.

In this embodiment, a description will be given of an example in which plural flow regulation members 38d are arranged on a conical side surface of a passage formation member 35 to configure a swirling promotion part as illustrated in FIGS. 11 and 12. FIG. 11 is a front view of the single passage formation member 35 when viewed from a direction (horizontal direction) perpendicular to an axial direction thereof, and FIG. 12 is an top view of the single passage formation member 35 when viewed from a top side (upper side) in the axial direction.

The flow regulation members 38d is formed of elongated prismatic members arranged on a portion of the outer peripheral surface of the passage formation member 35 that defines the diffuser passage 13c, and arranged spirally along the refrigerant flow when viewed from the axial direction of the passage formation member 35, as illustrated in FIG. 12. With this shape, the flow of refrigerant is led in the swirling direction to promote the swirling flow of refrigerant flowing in the diffuser passage 13c.

The other configurations and operation of the ejector refrigeration cycle 10 and the ejector 13 are identical with those in the first embodiment. Accordingly, the same advantages as those in the first embodiment can be obtained even in the ejector 13 of this embodiment.

That is, even when the swirling promotion part is configured by the plural flow regulation members 38d arranged on the top side of the passage formation member 35 as in the ejector 13 of this embodiment, the reduction in the velocity of the refrigerant flowing in the diffuser passage 13c in the swirling direction can be restricted in reducing the flow rate of refrigerant circulating in the ejector refrigeration cycle 10.

As a result, as with the first embodiment, the high energy conversion efficiency (corresponding to the nozzle efficiency in the conventional art) can be achieved in the nozzle passage 13a regardless of the load variations of the ejector refrigeration cycle 10 without upsizing the body. Further, the high pressurizing performance can be performed by the diffuser passage 13c.

In this embodiment, the example in which the flow regulation members 38d are arranged on the conical side surface of the passage formation member 35 is described. Alternatively, the flow regulation members 38d may be arranged on a portion of the inner peripheral surface of the body part 30 that defines the diffuser passage 13c (more specifically, a portion defining the diffuser passage 13c in the inner peripheral surface of the middle body 33), or the flow regulation members 38d may be arranged in both of the passage formation member 35 and the middle body 33.

Sixth Embodiment

Figure 13:
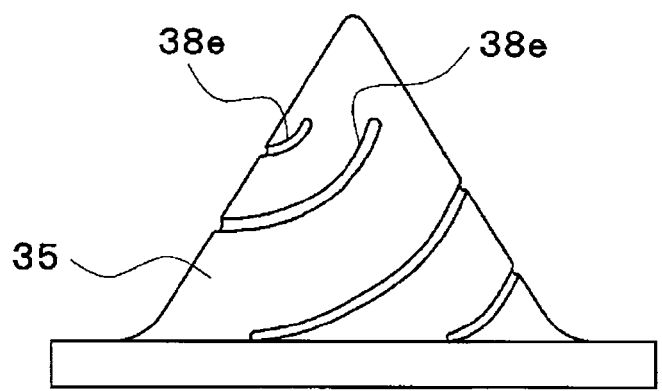
FIG. 13 is a side view of a passage formation member according to a sixth embodiment.
Figure 14:
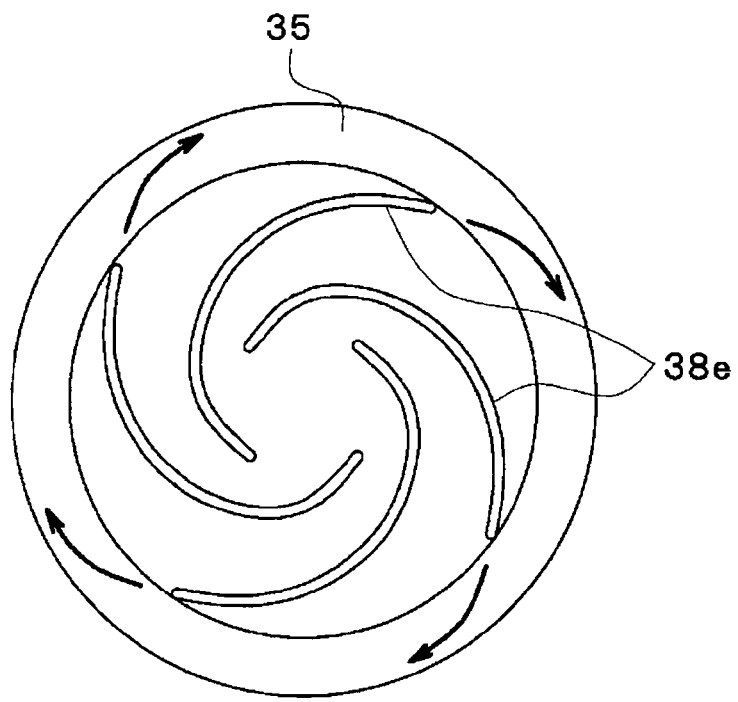
FIG. 14 is a top view of the passage formation member according to the sixth embodiment.

In this embodiment, a description will be given of an example in which, instead of the flow regulation members 38d of the fifth embodiment, plural grooves 38e are formed in a conical side surface of the passage formation member 35 to configure a swirling promotion part as illustrated in FIGS. 13 and 14. Meanwhile, FIGS. 13 and 14 are diagrams corresponding to FIGS. 11 and 12, respectively.

The grooves 38e are disposed on a portion of the outer peripheral surface of the passage formation member 35 that defines the diffuser passage 13c. As illustrated in FIG. 14, the grooves 38e extend to be curved along the swirling flowing direction when viewed from an axial direction of the passage formation member 35. With this shape, the flow of refrigerant is led in the swirling direction to promote the swirling flow of refrigerant flowing in the diffuser passage 13c.

The other configurations and operation of the ejector refrigeration cycle 10 and the ejector 13 are identical with those in the third embodiment. Therefore, as with the ejector 13 of this embodiment, even if the swirling promotion part is configured by the plural grooves 38e formed on the top side of the passage formation member 35, the same advantages as those in the fifth embodiment can be obtained.

In this embodiment, the example in which the plural grooves 38e are arranged on the conical side surface of the passage formation member 35 is described. Alternatively, the plural grooves 38e may be formed on a portion defining the diffuser passage 13c (more specifically, a portion of the inner peripheral surface of the middle body 33 that defines the diffuser passage 13c), or the plural grooves 38e may be formed in both of the passage formation member 35 and the nozzle body 32.

This disclosure is not limited to the above-mentioned embodiments, and may have various modifications as described below without departing from the gist of this disclosure.

(1) In the first and second embodiments, the example in which the flow regulation plates 38a are disposed in the portion defining the refrigerant outlet side of the diffuser passage 13c to promote the swirling flow of refrigerant flowing in the diffuser passage 13c has been described. However, the swirling flow of the refrigerant in the overall region extending from the inlet side to the outlet side of the diffuser passage 13c may not be promoted depending on the operating condition of the ejector refrigeration cycle 10.

Figure 15:
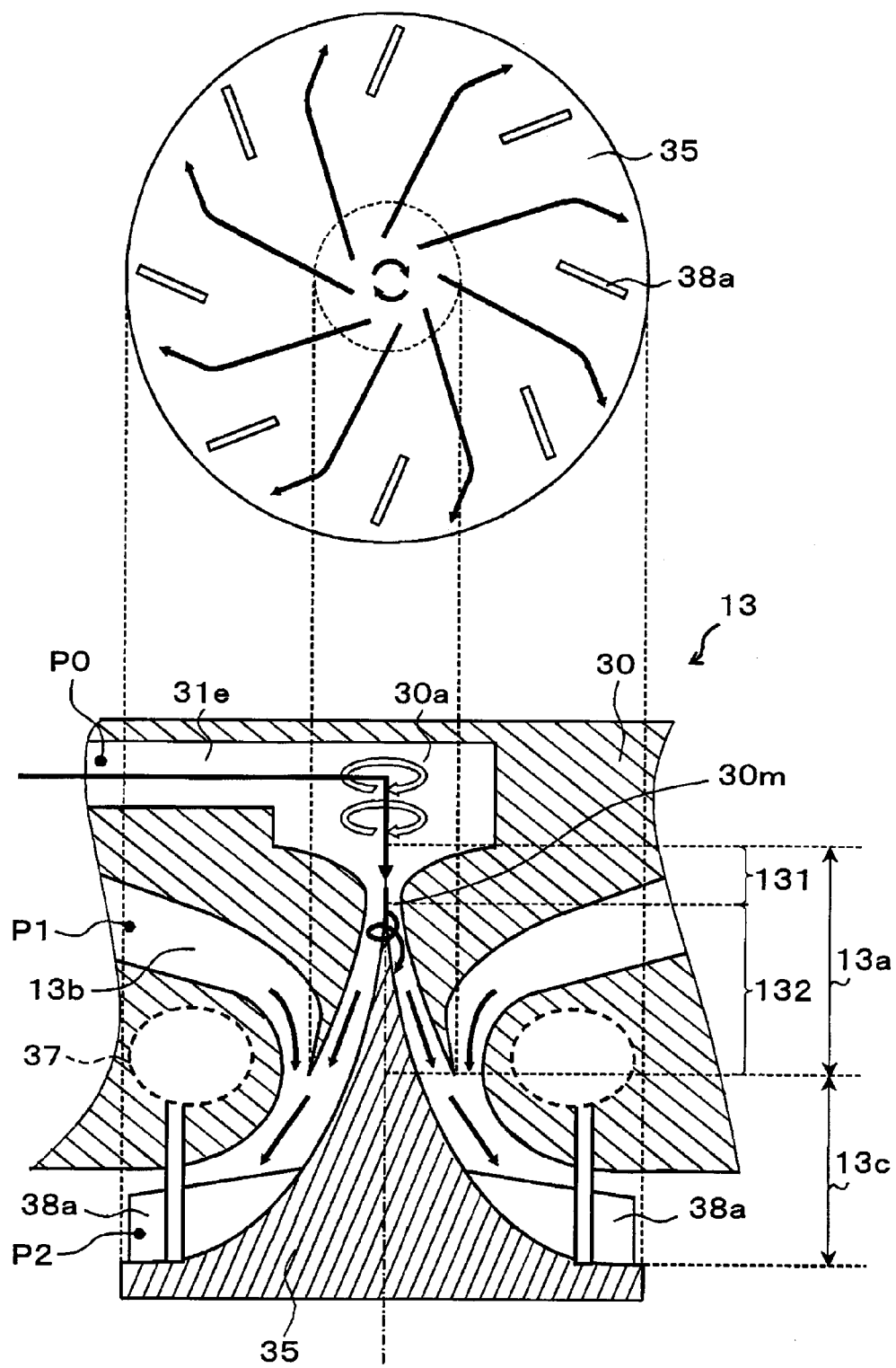
FIG. 15 is an illustrative view illustrating a refrigerant flow in a diffuser passage according to the first embodiment and the second embodiment.

Specifically, as indicated by thick solid lines in FIG. 15, a velocity component in the swirling direction may become extremely small as compared with a velocity component in the axial direction in the velocity components of the refrigerant flowing through the diffuser passage 13c, or most of the velocity component in the swirling direction may be eliminated. FIG. 15 schematically illustrates the flowing direction of the refrigerant flowing along the conical side surface of the passage formation member 35, and also schematically illustrates the flow regulation plates 38a in a flat plate, when viewed from the axial direction.

Even under the above operating conditions, according to the ejector of the first and second embodiments, since the flow regulation plates 38a which are an example of the swirling promotion part are disposed on the refrigerant outlet side of the diffuser passage 13c, the swirling flow of at least the refrigerant on the outlet side of the diffuser passage 13c and the refrigerant immediately before flowing out of the diffuser passage 13c can be promoted as illustrated in FIG. 15.

Therefore, the flow regulation plates 38a that are an example of the swirling promotion part can effectively restrict a reduction in the centrifugal force acting on the refrigerant which has flowed into the gas-liquid separation space 30f, and restrict a reduction in the gas-liquid separation performance in the gas-liquid separation space 30f.

(2) In the above-mentioned first embodiment, the example in which the flow regulation plates 38a curved in the direction of guiding the swirling flow is arranged radially around the axis when viewed from the axial direction of the passage formation member 35 to configure the swirling promotion part has been described. However, the swirling promotion part is not limited to this configuration. For example, the flow regulation plate formed in a plate shape may be arranged in the same manner as that in the above-mentioned embodiments. Further, in the ejector having the driving means 37, a cross-section of the actuating bar 37e in the axial direction may have the same shape as that of the above-mentioned flow regulation plate 38a, and the actuating bar 37e may function as the swirling promotion part.

(3) In the above embodiments, the details of the liquid-phase refrigerant outlet port 31c and the gas-phase refrigerant outlet port 31d of the ejector 13 are not described. Depressurizing means (for example, side fixed aperture orifice or a capillary tube) for depressurizing the refrigerant may be arranged on those refrigerant outlet ports. For example, a fixed aperture may be added to the liquid-phase refrigerant outlet port 31c, and the ejector 13 may be applied to an ejector refrigeration cycle of a two-stage pressurizing type compressor.

(4) In the above-mentioned embodiment, although a material of the passage formation member 35 is not described, the passage formation member 35 may be made of metal (for example, aluminum) or resin. For example, when the passage formation member 35 is made of resin, and reduced in weight, the driving means 37 can be downsized, and the body of the overall ejector 13 can be further downsized.

(5) In the above embodiments, the description has been given of the example in which the driving means 37 that displaces the passage formation member 35 includes the sealed space 37b in which the temperature sensitive medium having the pressure changed according to a change in the temperature is sealed, and the diaphragm 37a that is displaced according to the pressure of the temperature sensitive medium within the sealed space 37b. However, the driving means is not limited to this configuration.

For example, a thermowax having a volume changed according to the temperature may be employed as the temperature sensitive medium, or a configuration having an elastic member of a shape memory alloy may be used as the driving part. Further, a configuration in which the passage formation member 35 may be displaced by an electric mechanism such as an electric motor or a solenoid may be employed as the driving means.

(6) In the above embodiments, the example in which the ejector refrigeration cycle 10 including the ejector 13 of the present disclosure is applied to a vehicle air conditioning apparatus has been described, but the application of the ejector refrigeration cycle 10 having the ejector 13 of the present disclosure is not limited to this configuration. For example, the ejector refrigeration cycle 10 may be applied to, for example, a stationary air-conditioning apparatus, cold storage warehouse, a vending machine for cooling heating device, etc.

(7) Examples in which a subcooling heat exchanger is employed as the heat radiator 12 have been described in the above-mentioned embodiments, but, a normal heat radiator formed of only the condenser 12a may be employed as the heat radiator 12.

(8) Also, the means discloses in the above respective embodiments may be appropriately combined together in a feasible range. For example, as the swirling promotion part, the flow regulation plates 38a in the first embodiment, the flow regulation plates 38b in the third embodiment, and the flow regulation members 38d in the fifth embodiment may be employed at the same time.

The flow regulation plates 38b in the third embodiment may be arranged on the top side of the passage formation member 35 while the grooves 38c in the fourth embodiment may be provided in a portion the inner peripheral surface of the body part 30 that defines the nozzle passage 13a. Likewise, the flow regulation members 38d in the fifth embodiment may be arranged on the conical side surface of the passage formation member 35 while the grooves 38e in the sixth embodiment may be provided in a portion of the inner peripheral surface of the body part 30 that defines the diffuser passage 13c.

What is claimed is:

1. An ejector for a vapor compression refrigeration cycle device, the ejector comprising:
   a body part including a swirling space in which a refrigerant flowing from a refrigerant inlet port is swirled, a depressurizing space in which the refrigerant flowing out of the swirling space is depressurized, a suction passage that communicates with a downstream side of the depressurizing space in a refrigerant flow and draws a refrigerant from an external, and a pressurizing space in which a jet refrigerant jetted from the depressurizing space is mixed with a suction refrigerant drawn from the suction passage; and
   a passage formation member which includes at least a part disposed inside the depressurizing space and the pressurizing space and has a conical shape such that a cross-sectional area increases with distance from the depressurizing space, wherein
   the body part has a nozzle passage that is a refrigerant passage defined between an inner peripheral surface of a portion defining the depressurizing space and an outer peripheral surface of the passage formation member, and the nozzle passage functions as a nozzle that depressurizes and ejects the refrigerant flowing out of the swirling space,
   the body part has a diffuser passage that is a refrigerant passage defined between an inner peripheral surface of a portion defining the pressurizing space and the outer peripheral surface of the passage formation member and the diffuser passage functions as a diffuser that mixes the jet refrigerant and the suction refrigerant together and pressurizes the mixed refrigerant, and
   the diffuser passage has an annular shape in a cross-section perpendicular to an axial direction of the passage formation member,
   the ejector further comprising a swirling promotion part that promotes a swirling flow of the refrigerant flowing in the diffuser passage.

2. The ejector according to claim 1, wherein
   the swirling promotion part includes a plurality of flow regulation plates arranged on an outlet side of the diffuser passage, and
   the plurality of flow regulation plates is arranged radially around an axis of the passage formation member.

3. The ejector according to claim 2, wherein the plurality of flow regulation plates is arranged in an accelerating cascade.

4. The ejector according to claim 2, wherein the plurality of flow regulation plates is arranged in a decelerating cascade.

5. The ejector according to claim 1, wherein the swirling promotion part includes a flow regulation plate disposed on at least one of portions which are a portion of the inner peripheral surface of the body part that defines the nozzle passage and a portion of the outer peripheral surface of the passage formation member that defines the nozzle passage.

6. The ejector according to claim 1, wherein the swirling promotion part includes a groove provided on at least one of portions which are a portion of the inner peripheral surface of the body part that defines the nozzle passage and a portion of the outer peripheral surface of the passage formation member that defines the nozzle passage.

7. The ejector according to claim 1, wherein the swirling promotion part includes a flow regulation member disposed on at least one of portions which are a portion of the inner peripheral surface of the body part that defines the diffuser passage and a portion of the outer peripheral surface of the passage formation member that defines the diffuser passage.

8. The ejector according to claim 1, wherein the swirling promotion part includes a groove provided on at least one of portions which are a portion of the inner peripheral surface of the body part that defines the diffuser passage and a portion of the outer peripheral surface of the passage formation member that defines the diffuser passage.

9. The ejector according to claim 1, wherein the body part includes a gas-liquid separation space that separates the refrigerant flowing out of the pressurizing space into gas and liquid.

10. The ejector according to claim 1, wherein the refrigerant flowing in the diffuser passage swirls in the same direction as that of the refrigerant swirling in the swirling space.

* * * * *